(No Model.) 2 Sheets—Sheet 1.
J. F. EBERT.
CHECK ROWER FOR CORN PLANTERS.
No. 282,508. Patented Aug. 7, 1883.
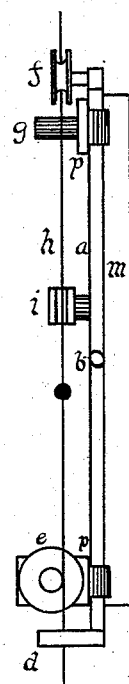
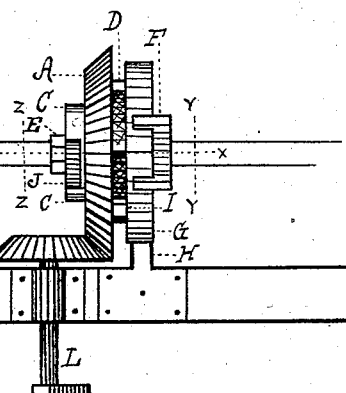
FIG. 1.
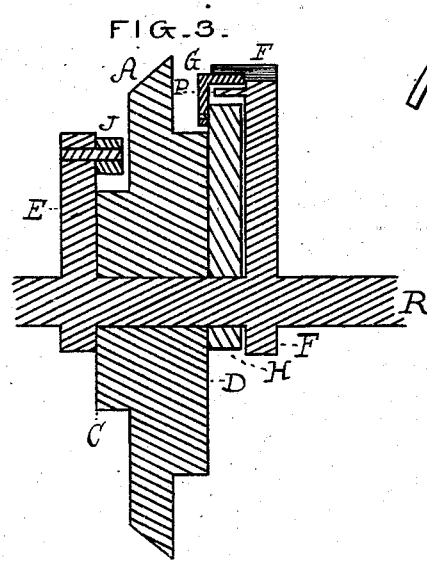
FIG. 2.
FIG. 3.
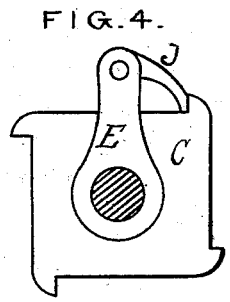
FIG. 4.
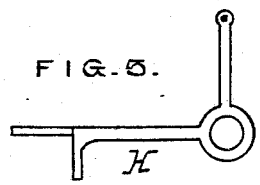
FIG. 5.
Witnesses
A. L. Hill
P. D. Walker
Inventor
Jacob F. Ebert.
By L. P. Graham
atty.

(No Model.)
2 Sheets—Sheet 2.
J. F. EBERT.
CHECK ROWER FOR CORN PLANTERS.
No. 282,508.  Patented Aug. 7, 1883.
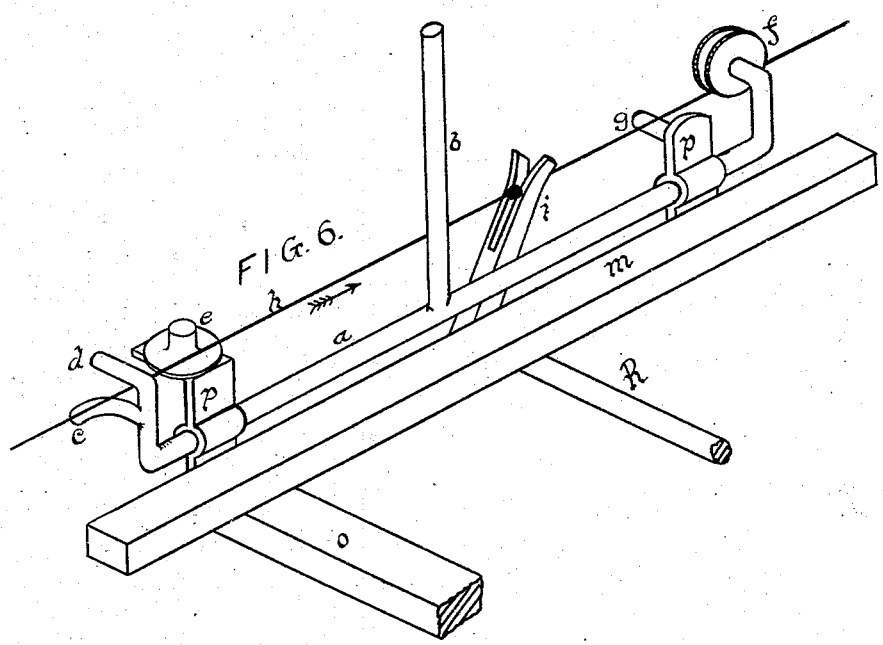
Witnesses
W. J. Walker
J. D. Walker
Inventor
Jacob F. Ebert.
By L. P. Graham
atty.

UNITED STATES PATENT OFFICE.

JACOB F. EBERT, OF DECATUR, ILLINOIS.

CHECK-ROWER FOR CORN-PLANTERS.

SPECIFICATION forming part of Letters Patent No. 282,508, dated August 7, 1883.

Application filed February 7, 1883. (No model.)

*To all whom it may concern:*

Be it known that I, JACOB F. EBERT, a resident of the city of Decatur, county of Macon, and State of Illinois, have invented certain new and useful Improvements in Check-Rowers for Corn-Planters, of which the following is a specification sufficiently full, clear, and exact to enable any one skilled in the art to which it relates to make and operate the same.

My invention consists in an improved device for conveying the reciprocating motion of the check-row tappet to the seed-slides of the corn-planter, and in a device that operates as an auxiliary guide for the check-row wire while the same is operating a check-rower, and by means of which said wire may be disconnected from the check-rower without the inconvenience of dismounting from the planter.

The details of my wire-disconnecting device may be substantially described as follows: An oscillating shaft is attached to the check-rower on a line parallel with the check-row wire, provided at one end with a pair of arms that extend one above and one below the wire, provided at the other end with an arm that projects over the wire and carries a pulley whose sides extend down astride the wire and form lateral guides therefor, and also provided with a lever by means of which it is oscillated and the wire disconnected from the check-rower. Co-operating with the above is a receiving-pulley, so formed as to support the wire from below and on one side, and a discharge-roller that supports the wire from beneath.

My device for conveying the motion of the check-row tappet to the seed-slides of the corn-planter consists in detail in a shaft laid transversely across the planter, oscillated by the check-row tappet, provided with a rotating gear-wheel that has a propelling-ratchet on one face and a lock-ratchet on the other, provided with a rigid arm that operates the propelling-ratchet, provided with a rigid arm that operates the lock, and provided with a swinging segmental locking-pawl. Co-operating with the above-mentioned gear-wheel is a pinion that operates the arm that throws the seed-slides, said pinion making a one-half revolution at every stroke of the check-row tappet.

In the drawings accompanying and forming a part of this specification, Figure 1 is a plan of a check-rower in which my devices are embodied. Fig. 2 is an elevation of the locking device from dotted line *y y*. Fig. 3 is a vertical section of the gear with its locking and propelling devices on dotted line *x x*. Fig. 4 is an elevation of the gear-propelling device from dotted line *z z*. Fig. 5 is a side elevation of the device used to support the shaft, and from which the lock-pawl is suspended. Fig. 6 is a perspective view of the device used to disconnect the wire from the check-rower.

A is a gear-wheel rotating loosely on shaft R.

C is a propelling ratchet-wheel rigid with wheel A.

D is a lock-ratchet wheel, also rigid with wheel A.

E is a propelling-arm, rigid on shaft R, that carries pawl J.

F' is a locking-arm, also rigid on shaft R, and provided with projections F F and P, that operate the lock-pawl.

G is a rocking segmental pawl, provided with catch I and suspended from support H. H projects horizontally from the check-row bar *o* to shaft R, for which it provides a bearing, and from which it extends upward and forms a point of suspension for rocking pawl G.

B is a pinion in gear with A, making a semi-revolution at every stroke of the tappet.

L is an arm that connects with the seed-slides of a planter, and by means of which said seed-slides are operated.

*a* is an oscillating shaft laying parallel with the check-row wire.

*b* is a lever by which shaft *a* is operated.

*c* is an arm that is used to throw the wire out of the check-rower.

*d* is an arm that is used to hold the wire in the check-rower.

*e* is a pulley that supports the wire from below and on one side.

*f* is a pulley that guides the wire laterally and from above.

*g* is an arm that supports the wire below.

*h* is the check-row wire.

*i* is the check-row tappet.

*o* is a bar that extends transversely across the planter.

*m* is the bar to which my wire-disconnecting device is attached.

*p p* are bearings for pulley *e* and arm *g*.

To disconnect the wire from the check-rower, shaft *a* is given a partial revolution through lever b, which raises pulley f and arm d from contact with the wire, while arm c carries said wire up out of the crotch in tappet i and free from pulley e.

I prefer to bend arm c, as shown, and arms d and g should be provided with friction-rollers.

Pawl G describes a segment of a larger circle than that described by arm F', and as said arm oscillates it causes the ends of said pawl to alternately approach the ratchet-wheel, thus locking the gear when a stroke is completed and unlocking it before a stroke is commenced.

As the lock-pawl, swinging loosely on its fulcrum, cannot be relied on to maintain a uniform motion, I provide my arm with projections F F, that extend over, and projection P, that extends under, the rim of said pawl, thereby guiding it in its oscillations and securing uniformity of motion.

Tappet i is oscillated by being thrown in one direction by the stops on the check-row wire, and returned by a spring, weight, or other automatic device. The oscillating motion of the tappet is conveyed to the arms E and F' through shaft R. As the tappet makes a stroke arm E, through pawl J, carries C, A, and D around until arm F causes catch I to lock the ratchet D. This completes the stroke, and the tappet, shaft, and arms return to their first position and unlock the ratchet by raising I from contact therewith.

As before stated, a stroke of the tappet produces a semi-revolution in arm L, and as arm L is so connected with the seed-slides as to stop on a line with its connecting-rod a lock is thereby formed that prevents A from rotating until thrown by pawl J.

As shown in the drawings, a drop is effected by the automatic return of the tappet. In actual use the drop will be caused by the throw of the check-row stop.

I am aware of the patents to Lord, No. 232,137, September 14, 1880; Eberhart, No. 268,085, November 28, 1882; Johnson, No. 272,702, February 20, 1883, and Whittaker and More, No. 273,789, March 13, 1883, in which devices are shown that assist in discharging the cord or wire from the check-rower, and I hereby disclaim all matter claimed therein.

I claim—

1. In a check-rower, the combination of oscillating shaft R, provided with arms E F', loose working gear-wheel A, provided with propelling ratchet-wheel C and lock ratchet-wheel D, and lock-pawl G, constructed, as shown, and pivoted to upright H, all substantially as and for the purpose set forth.

2. Segmental pawl G, ratchet-wheel D, and arm F', provided with projections F F and P, all in combination, as and for the purpose set forth.

3. The combination of shaft a, lever b, arms c d, and pulley e, as and for the purpose set forth.

4. The combination of shaft a, lever b, arms c d, pulleys e f, and roller g, as and for the purpose set forth.

JACOB F. EBERT.

Attest:
J. D. WALKER,
L. P. GRAHAM.